UNITED STATES PATENT OFFICE.

JOHN HARRISON, OF STILLWATER, NEW YORK.

IMPROVEMENT IN COMPOSITIONS FOR DOOR-KNOBS, &c.

Specification forming part of Letters Patent No. 5,315, dated October 2, 1847.

*To all whom it may concern:*

Be it known that I, JOHN HARRISON, of Stillwater, in the county of Saratoga and State of New York, have invented a new and useful improvement, not known or used before, in the making or manufacturing of door, bureau, umbrella, and parasol knobs, candlesticks, knife-handles, whip-mountings, cane-heads, &c., which invention and the manner of using it are as follows:

This improvement consists in the use of and process of compounding the following materials, viz:

|   | No. 1. | No. 2. |
|---|---|---|
| 1. | Bone, calcined, pulverized, and ground, | 10 parts. |
| 2. | Black flint, | 4 " |
| 3. | Crystal feldspar, | 10 " |
| 4. | Granite, | 10 " |
| 5. | Vermont white sand, | 10 " |
| 6. | China-clay, | 11 " |
| 7. | Chromate of potash, | 1 part. |
| 8. | Litharge, | 1 " |
| 9. | Antimony, | 1 " |
| 10. | Chrome green, | 1 " |
| 11. | Oxide of iron, | 3 parts. |
| 12. | Oxide of tin, | 1 part. |
| 13. | Oxide of zinc, | 1 " |
| 14. | Oxide of manganese, | 4 parts. |

No. 3. The above articles are calcined, pulverized, and ground in water by water-power, and constitute the body and everything necessary for the manufacture of JOHN HARRISON'S fossil-granite knobs, candlesticks, knife-handles, whip-mountings, cane-heads, &c. The materials, previous to using, are all passed through silk sieves imported for that purpose, and the process of kiln firing, baking, and glazing is in all respects similar to that adopted in the manufacture of transparent china.

The originality of the process by which the article is perfected consists, first, in the character of the materials forming or constituting the body, (indicated by No. 1;) secondly, the proportions used in compounding the same, (indicated by No. 2;) thirdly, the subjection of the articles, when molded in their varied forms, to the long-continued action of heat both in the biscuit state and in the process of glazing; and, fourthly, the materials that form the glaze, all having exclusive reference to the articles claimed to be patented.

After receiving their appropriate forms, the knobs, candlesticks, knife-handles, &c., are placed in what is usually termed the "biscuit" state in the kiln and subjected to an intense degree of heat from twenty-four to thirty hours. They are then removed, and after the materials, hereinafter described, that compose the glaze are added a further exposure to the renewed action of the same degree of heat from eighteen to twenty-four hours completes the process.

*Glaze.*—The materials that form the glaze are prepared in the same manner as heretofore described (No. 3) for the powder, pulp, and slip for the body. The proportions used in making the frit are as follows:

Frit for glaze No. 1: feldspar, twenty parts; pulverized and ground flint, ten parts; oxide of tin, two parts; oxide of zinc, two parts; litharge, two parts.

The above articles are prepared as stated in No. 3, put in seggars in the gloss-kiln, and after exposure to the action of intense heat from eighteen to twenty-four hours they become of a crystalline nature. They are then pulverized and used with other materials in the following proportions: one hundred and twenty pounds of the above frit, forty pounds of feldspar, forty pounds of flint, and forty pounds of pure white lead. This preparation constitutes glaze No. 1.

The above glaze is made to exhibit any desired color by the use of the different metallic oxides. One pound of manganese will tint or stain ten pounds of the above glaze, and the different oxides are used in the same proportions. Manganese stains a dark brown; iron, a black; chrome green, a green; cobalt blue, by adding zinc or tin in the proportion of one ounce to twenty of the other oxides, produces a brighter tint. The same proportions of coloring-matter will answer for the body as well as the glaze. This glaze I claim as my sole invention.

As a general principle, it may be said, first, the oxides combined with the materials that compose the body communicate its extreme solidity; second, the materials that compose the glaze, in connection with the peculiar process they undergo, produce that superior degree of beauty and excellence hereinafter claimed.

I claim—

1. The application of the materials above specified in certain proportions, and a specific and original method of compounding the same as applied to the manufacture of the articles above enumerated, (No. 3,) as a new invention, resulting in the production of an article in every point of view superior to any heretofore produced from any similar composition of matter.

2. I also claim to be the sole and original inventor, as applied to the manufactured articles above enumerated, (No. 3,) of the process from which they derive their peculiar beauty and excellence, combined with the essential and desirable property of durability, inasmuch as atmospheric influence cannot, as in the case of the ordinary earthen knob, under any circumstances deteriorate the essential properties of the compound.

JOHN HARRISON.

Witnesses:
    JAMES O. DONNELL,
    GORHAM DENISON.